(12) United States Patent
Taniguchi et al.

(10) Patent No.: US 6,978,020 B2
(45) Date of Patent: Dec. 20, 2005

(54) SYSTEM AND METHOD FOR DISTRIBUTING DIGITAL CONTENT

(75) Inventors: Masayuki Taniguchi, Tokyo (JP); Hideki Yamamoto, Tokyo (JP); Masaki Sato, Tokyo (JP); Norio Kondo, Tokyo (JP); Atsushi Ikeno, Kyoto (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 857 days.

(21) Appl. No.: 09/859,812

(22) Filed: May 18, 2001

(65) Prior Publication Data

US 2002/0023058 A1  Feb. 21, 2002

(30) Foreign Application Priority Data

May 18, 2000  (JP)  ............................. 2000-146367

(51) Int. Cl.$^7$ ............................................. H04N 7/167
(52) U.S. Cl. ..................................... 380/201; 713/201
(58) Field of Search ....................... 380/201; 713/200, 713/201

(56) References Cited

U.S. PATENT DOCUMENTS 6,005,643 A  * 12/1999  Morimoto et al. ..... 375/240.26

FOREIGN PATENT DOCUMENTS

JP        10-254909        9/1998

OTHER PUBLICATIONS

Patent Abstracts of Japan, Publication No. 10-254909.

* cited by examiner

*Primary Examiner*—Gregory Morse
(74) *Attorney, Agent, or Firm*—Venable LLP; Michael A. Sartori; Catherine M. Voorhees

(57) ABSTRACT

A system and method for distributing digital content is capable of preventing illegal use of digital content and leak of user information. A creator terminal 110 forwards content, copyright information and conditions for quotation to a content distribution server 120. A user terminal 130 forwards an application for using the content to the content distribution server 120. The content distribution server 120 embeds copyright information in the content to which the user terminal 130 has forwarded the application for using the content and the user information is embedded in the content to which the user terminal 130 has forwarded the application for using the content. The relation among a content size Sq which is permitted to be quoted according to conditions for quotation, a content size Sc in which the copyright information is embedded and a content size Su in which the user information is embedded is expressed by $Sc<Sq<Su$.

25 Claims, 10 Drawing Sheets

Sc: BLOCK OF ELECTRONIC WATERMARK WITH COPYRIGHT INFORMATION EMBEDDED

FIG.4

Q2: QUOTED CONTENT

Su: BLOCK OF ELECTRONIC WATERMARK WITH USER INFORMATION EMBEDDED

Q1: QUOTED CONTENT

FIG.5

COPYRIGHT INFORMATION BLOCK WITH ELECTRONIC WATERMARK: Tc

USER INFORMATION BLOCK WITH ELECTRONIC WATERMARK: Tu

QUOTED CONTENT: Q3          QUOTED CONTENT: Q4

SYSTEM AND METHOD FOR DISTRIBUTING DIGITAL CONTENT

BACKGROUND OF THE INVENTION

1. Field of the Invention

The present invention relates to a system for circulating digital content and more particularly to a system and method for distributing digital content through a network.

Recently, remarkable progress has been achieved in network technique. For example, pictures, music, and the like which are transformed into digitized data can be transmitted with ease and high speed through a network, such as the Internet. Along with this progress, the illegal use, illegal acquisition, leak and the like of the pictures, music, and the like which are transformed into digitized data (hereafter referred to as "digital content") can be achieved with ease on the Internet so that there is a problem to protect the copyright of the digital content.

2. Related Art

The technique to prevent the illegal use, illegal acquisition, leak and the like of the digital content described above is disclosed in Japanese laid-open publication No. JP10-254909, in which the technique to detect the illegal use of the digital content smoothly by using an electronic watermark to embed not only the copyright information but also the user information on the digital content which is distributed is disclosed.

The published works are permitted to be quoted as long as the profit of the copyrighter is not unfairly infringed. With regard to this point, copyright law provides that some published works can be quoted and thus utilized by others. However, in the conventional art, since the user information is embedded in the digital content even when the digital content is quoted fairly, there is a problem in that the user information can be leaked unintentionally.

In addition, since the method for quoting is not definitely provided in many cases of purchasing the digital content, frequent problems have been caused between the creator of the digital content and the quoter of the digital content.

An object of the present invention is to provide a novel and improved system for distributing digital content and a novel and improved method for distributing digital content, which are capable of preventing the illegal use of the digital content and the leak of the user information.

SUMMARY OF THE INVENTION

To achieve the above object, in a first aspect of the present invention, a system for distributing digital content is provided, and the system comprises: at least one creator terminal creating the digital content; at least one user terminal utilizing the digital content; and a content distribution server which distributes the digital content to the user terminals, and which includes a content database for storing the digital content forwarded from the creator terminals, a content information database for storing copyright information and conditions for quotation of the digital content; copyright information embedding means for embedding the copyright information in the digital content and user information embedding means for embedding the user information in the digital content. The relation among a content size Sq which is permitted to be quoted according to conditions for quotations, a content size Sc in which the copyright information is embedded and a content size Su in which the user information is embedded is expressed by Sc<Sq<Su.

In the present invention, the copyright information corresponds to the information which is embedded in the digital content to specify the creator and which is capable of embedding various kinds of information such as the copyrighter's name, address, e-mail address and the host computer of the creator terminals and capable of adopting a registration system in which the creator registers for the content distribution server to utilize the registration number as a part of the copyright information.

Similarly, the user information corresponds to the information which is embedded in the digital content to specify the user and which is capable of embedding various kinds of information such as the user's name, address, e-mail address and the host computer of the user terminals and capable of adopting a registration system in which the user registers for the content distribution server to utilize the registration number as a part of the user information.

The conditions for quotation correspond to the conditions set so that the copyrighter may give the permission to quote his works. If the content is formed in pictures (still pictures), the conditions are to be set on the areas of the content, characteristic and predetermined objects and the like. If the content are formed in music (moving pictures), the conditions are to be set on the length of time of the content, characteristic and predetermined tunes (scenes) and the like.

In addition, the content size corresponds to the physical quantity having the same dimension as that of the conditions for quotation. For example, "(content size A)<(content size B)" expresses content B having larger physical quantity than content A, which corresponds to the case in which the pictures have large areas and to the case in which the time of the music is long, in the above examples, and content B embedding content A, which corresponds to the case embedding the predetermined objects and the predetermined tunes (scenes), in the above examples.

By adopting the above system, when a user of the digital content quotes according to the conditions for quotation, the user information, which is not fully embedded in the content which has been quoted (hereafter referred to as "quoted content"), cannot be read out. Consequently, the user information is to be prevented from being leaked. On the other hand, when a user of the digital content quotes against the conditions for quotation, the user information, all of which is embedded in the quoted content, can be read out. Consequently, the user against the conditions for quotation is to be specified, and the illegal use of the digital content is to be prevented.

To achieve the utmost effect of the present invention, it is necessary to embed the copyright information and the user information in the digital content effectively. First of all, it is necessary to embed the copyright information so that the copyright information may be embedded in the quoted content whenever the digital content is quoted. Namely, it is necessary that the content size Sc with the copyright information embedded be smaller than the content size Sq with the quotation permitted according to the conditions for quotation.

On the other hand, it is necessary to embed the user information in the quoted content without fail so that the user information may be embedded in the quoted content when the digital content are illegally quoted. Namely, it is necessary that the content size Su with the user information embedded have essentially the same or a little larger size compared to that of the content size Sq with the quotation permitted according to the conditions for quotation.

Preferably, the user terminals include content storing means for storing the digital content distributed from the content distribution server, content information storing means for storing the copyright information and the conditions for quotation of the digital content distributed from the content distribution server and content quotation verification means for judging whether the quotation of the digital content on the user terminal meets the conditions for quotation or not. In this configuration, by setting the content quotation verification means for judging whether the quotation of the digital content on the user terminal meets the conditions for quotation or not, when the user of the digital content quotes against the conditions for quotation on the user terminal, the user is to be alarmed. Consequently, the careless illegal quotation of the content and the leak of the user information are to be prevented.

Preferably, the content distribution server includes content search means for searching the digital content stored in the content information database and content information display means for displaying the copyright information and the conditions for quotation of the digital content based on the content search means. In this configuration, since the conditions for quotation are shown to the user in advance, the user can save the trouble of asking for the creator's permission to quote the digital content.

In addition, the copyright information embedding means may embed the copyright information in the digital content by using the electronic watermark. Similarly, the user information embedding means may embed the user information in the digital content by using the electronic watermark. In this configuration, the copyright information and the user information are to be embedded without influencing the quotation of the digital content and to be prevented from tampered with effectively.

Further, in a second aspect of the present invention, a system for distributing digital content is provided, and the system comprises: at least one creator terminal creating the digital content; at least one user terminal utilizing the digital content; and a content distribution server which distributes the digital content to the user terminals. The creator terminals embed the copyright information embedding means for embedding the copyright information in the digital content. Also, the content distribution server includes a content database for storing the digital content forwarded from the creator terminals, a content information database for storing the copyright information and the conditions for quotation of the digital content; and user information embedding means for embedding the user information in the digital content. The relation among a content size Sq which is permitted to be quoted according to conditions for quotation, a content size Sc in which the copyright information is embedded and a content size Su in which the user information is embedded is expressed by Sc<Sq<Su.

By adopting the above system, the effect which is essentially identical to that of the system according to the first aspect of the present invention can be achieved. In addition, since the creator terminals embed the copyright information embedding means for embedding the copyright information in the digital content, the original digital content can be protected even when the digital content are leaked while the content distribution server distributes the digital content.

Further, in the third aspect of the present invention, a method for distributing digital content is provided, and the system comprises: at least one creator terminal creating the digital content; at least one user terminal utilizing the digital content; and a content distribution server which distributes the digital content to the user terminals. The method for distributing digital content comprises: a step in which the creator terminal forwards the digital content, copyright information of the digital content, and conditions for quotation the digital content to the content distribution server; a step in which the user terminal forwards the application for using the digital content to the content distribution server; and a step in which the content distribution server embeds the copyright information in the digital content which the user terminals have applied for using and embeds the user information in the digital content. The relation among a content size Sq which is permitted to be quoted according to conditions for quotation, a content size Sc in which the copyright information is embedded and a content size Su in which the user information is embedded is expressed by Sc<Sq<Su.

By adopting the above method, when a user of the digital content quotes according to the conditions for quotation, the user information, which is not totally embedded in the quoted content, cannot be read out. Consequently, the user information is to be prevented from being leaked. On the other hand, when a user of the digital content quotes against the conditions for quotation, the user information, all of which is embedded in the quoted content, can be read out. Consequently, the user against the conditions for quotation is to be specified, and the illegal use of the digital content is to be prevented.

Preferably, the method includes a step for judging whether the quotation of the digital content on the user terminal meets the conditions for quotation or not. In this method, when the user of the digital content quotes against the conditions for quotation on the user terminal, the user is to be alarmed. Consequently, the careless illegal quotation of the content and the leak of the user information are to be prevented.

Preferably, the method also includes a step in which the user terminals forward the search conditions of the digital content to the content distribution server, and a step in which the content distribution server searches the digital content in accordance with the search conditions of the content and forwards the result of search the user terminals. In this method, since the conditions for quotation are shown to the user in advance, the user can save the trouble of asking for the creator's permission to quote the digital content.

In addition, the copyright information embedding means may embed the copyright information in the digital content by using the electronic watermark. Similarly, the user information embedding means may embed the user information in the digital content by using the electronic watermark. In this configuration, the copyright information and the user information are to be embedded without influencing the quotation of the digital content and to be prevented from tampered with effectively.

Further, in the fourth aspect of the present invention, a method for distributing digital content is provided, and the system comprises: at least one creator terminal creating the digital content; at least one user terminal utilizing the digital content; and a content distribution server which distributes the digital content to the user terminals. The method for distributing digital content comprises: a step in which the creator terminals forward the digital content, the copyright information of the digital content, and the quotation conditions of the digital content to the content distribution server; a step in which the content distribution server embeds the copyright information in the digital content forwarded from the creator terminals; a step in which the user terminals forward the application for using the digital content to the content distribution server; and a step in which the content distribution server embeds the user information in the digital content. The relation among a content size Sq which is permitted to be quoted according to conditions for quotation, a content size Sc in which the copyright information is embedded and a content size Su in which the user information is embedded is expressed by Sc<Sq<Su.

By adopting the above method, the effect which is essentially identical to that of the system according to the third aspect of the present invention can be achieved. Also, since the content distribution server embeds the copyright information in all of the digital content forwarded from the creator terminals whether the user terminals forward the application for using the digital content to the content distribution server or not, the original digital content can be protected even when the security for the content distribution server is not protected.

To achieve the above object, in the fifth aspect of the present invention, a method for distributing digital content is provided, and the system comprises: at least one creator terminal creating the digital content; at least one user terminal utilizing the digital content; and a content distribution server which distributes the digital content to the user terminals. The method for distributing digital content comprises: a step in which the creator terminal forwards the copyright information of the digital content, and the quotation conditions of the digital content to the content distribution server; a step in which the creator terminal embeds the copyright information in the digital content and forward the digital content with the copyright information embedded to the content distribution server; and a step in which the content distribution server embeds the user information in the digital content. The relation among a content size Sq which is permitted to be quoted according to conditions for quotation, a content size Sc in which the copyright information is embedded and a content size Su in which the user information is embedded is expressed by Sc<Sq<Su.

By adopting the above method, the effect which is essentially identical to that of the system according to the first aspect of the present invention can be achieved. In addition, since the creator terminals embed the copyright information in the digital content, the original digital content can be protected even when the digital content are leaked while the content distribution server distributes the digital content.

BRIEF DESCRIPTION OF THE DRAWINGS

The above and other features of the invention and the concomitant advantages will be better understood by persons skilled in the art in view of the following description and the accompanying drawings. In the drawings.

DETAILED DESCRIPTION OF THE PREFERRED EMBODIMENTS

Hereinafter, the preferred embodiments of the system and method for distributing digital content of the present invention will be described in detail with reference to the accompanying drawings. Same reference numerals are attached to components having same functions in following description and the accompanying drawings and a description thereof is omitted.

(First Embodiment)

The first embodiment of the present invention is explained in reference to FIGS. 1–5, citing an example that the digital content are formed in still pictures.

Figure 1:
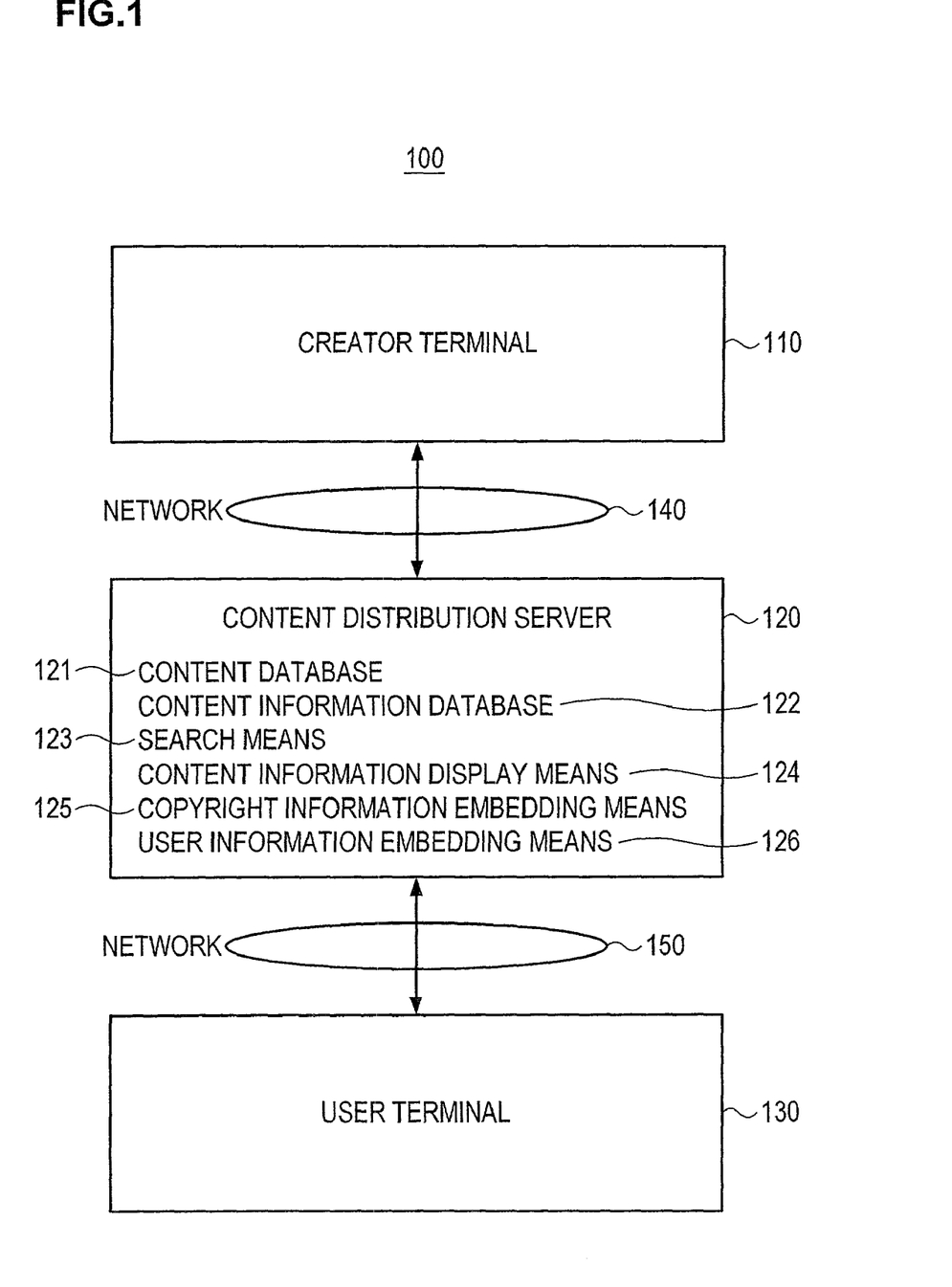
FIG. 1 is a chart illustrating a system for distributing digital content of the first and second embodiments.

As shown in FIG. 1, the digital content distribution system 100 comprises a creator terminal 110 which is used by the creators or managers of the digital content who create or manage the digital content (hereafter referred to as "creator"), a user terminal 130 which is used by the user of the digital content and a content distribution server 120 distributing the digital content to the user terminal 130. The content distribution server 120 and the creator terminal 110 are connected each other through a network 140. The content distribution server 120 and the user terminal 130 are connected to each other through a network 150. The network 140 and 150 may be identical to each other.

The explanation is provided with regard to the content distribution server 120 which is the characteristic component of the system in this embodiment.

The content distribution server 120 embeds a content database 121 for storing the digital content forwarded from the creator terminal 110, a content information database 122 for storing the copyright information and the conditions for quotation of the digital content forwarded from the creator terminal 110 to relate with the digital content stored in the content database 121.

In this embodiment, since the explanation is provided by citing pictures as an example of the digital content, the conditions for quotation are to be set on predetermined areas of the pictures, characteristic and predetermined objects and the like.

Also, the forms of using after the quotation may be set as the conditions for using, for example, method for using, period of using, number of times of using, region of using, compensation for using and the like. The condition for using can be forwarded from the creator terminal 110 to the content distribution server 120 along with or apart from the conditions for quotation.

In addition, the content distribution server 120 includes search means 123 for content search for searching the digital content stored in the content information database 122 and content information display means 124 for displaying the copyright information of the digital content and the conditions for quotation of the digital content based on the result of the search with the search means 123 for content search. It is to be noted that the search means 123 for content search and the content information display means 124 are not necessarily the essential components.

Further, the content distribution server 120 includes copyright information embedding means 125 for embedding an electronic watermark with copyright information included in the digital content and user information embedding means 126 for embedding an electronic watermark with user information included in the digital content. It is to be noted that the method for embedding the copyright information and the user information in the digital content is not restricted to the method by using the electronic watermark. The explanation with regard to embedding the electronic watermark is to be provided later.

Figure 2:
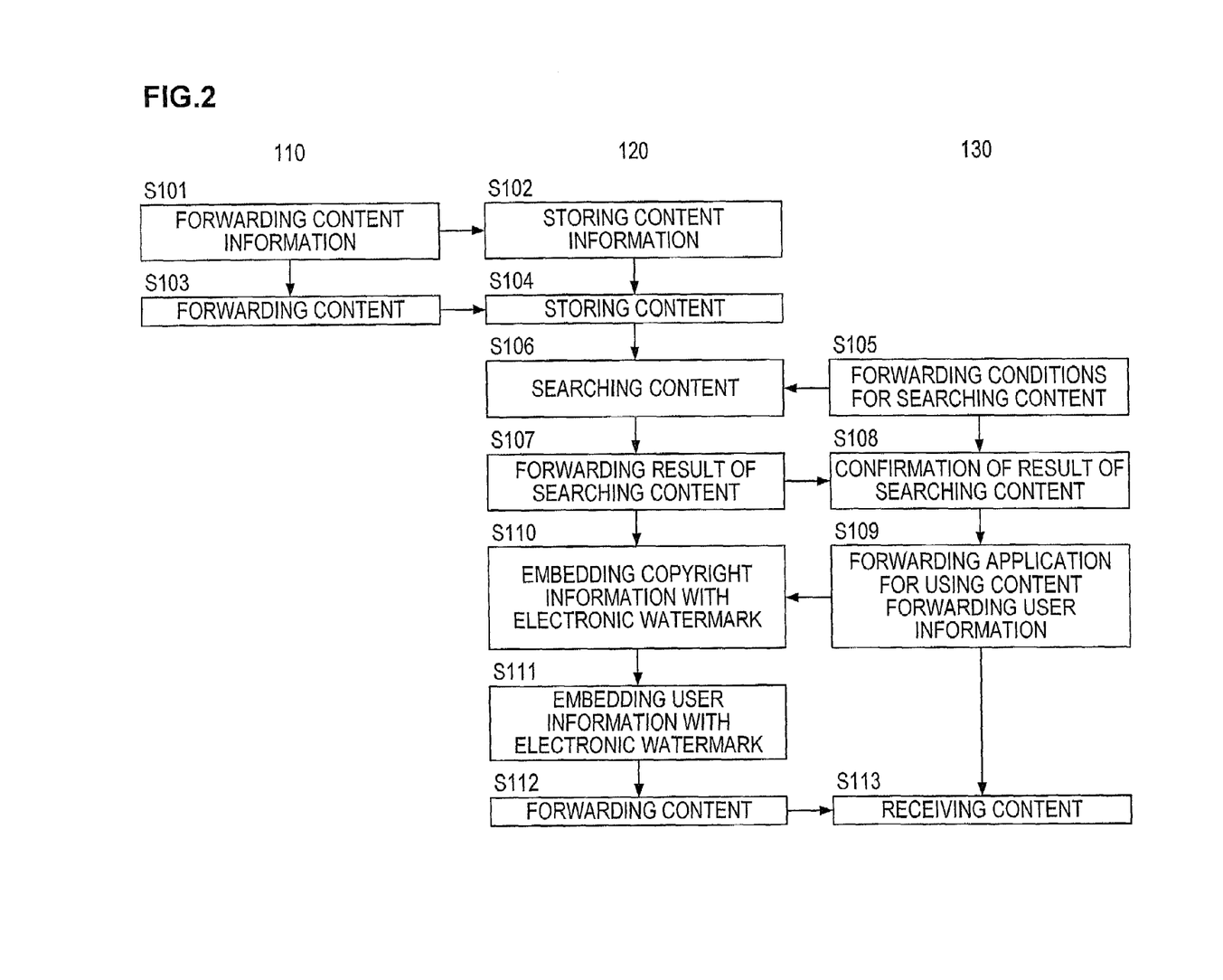
FIG. 2 is a flow chart of a method for distributing digital content with the system of FIG. 1 adopted.

The method for distributing the digital content with the digital content distribution system 100 is shown in the flow chart of FIG. 2.

The creator of the digital content forwards the copyright information of the digital content and the conditions for quotation of the digital content which the creator is to distribute to the content distribution server 120 by using the creator terminal 110 (step S101). In the content distribution server 120, the copyright information of the digital content and the conditions for quotation of the digital content which have been forwarded from the creator terminal 110 are stored in the content information database 122 to relate with the digital content forwarded afterward (step S102).

The creator of the digital content forwards the digital content which the creator is to distribute to the content distribution server 120 by using the creator terminal 110 (step S103). In the content distribution server 120, the digital content which has been forwarded from the creator terminal 110 are stored in the content database 121 (step S104).

The user of the digital content accesses the content distribution server 120 and forwards the search conditions of the digital content which the user wants to use to the content distribution server 120 by using the user terminal 130 (step S105). The content distribution server 120 search the digital content which meet the search conditions in accordance with the request for search from the user by using the search means 123 (step S106).

The content distribution server 120 forwards or displays the copyright information of the digital content and the conditions of quotation of the digital content, which meet the result of search, on step S106 to the user terminal 130 by using content information display means 124 (step S107).

The user of the digital content confirms the copyright information of the digital content and the conditions of quotation of the digital content (step S108). If the user agrees on the conditions, the user forwards the application for using the digital content and the user information to the content distribution server 120 (step S109).

In the content distribution server 120, upon receiving the application for using the digital content from the user, the copyright information corresponding to the digital content stored in content information database 122 is embedded in the digital content stored in the content database 121 by using the copyright information embedding means 125 (step S110).

Figure 3:
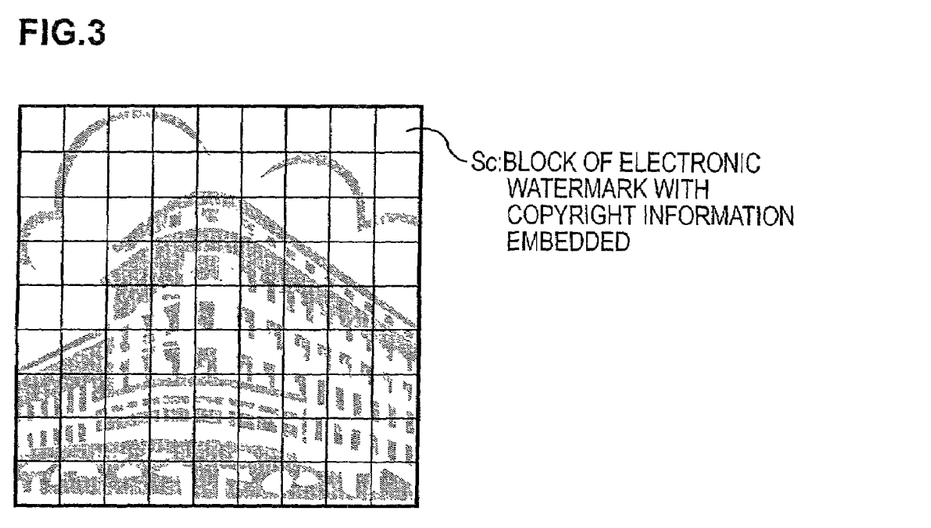
FIG. 3 is a chart illustrating a step embedding a copyright information.

As shown in FIG. 3, the copyright information can be embedded in each of the plural blocks into which the digital content are divided. In this example, it is necessary to embed the copyright information so that the copyright information may be embedded in the quoted content in any quotation of the digital content. Preferably, the size Sc of each block, which is necessary to embed the copyright information by using the electronic watermark, is smaller than the content size Sq with the quotation permitted according to the conditions for quotation (Sc<Sq).

In reference to the flow chart of FIG. 2 again, the user information forwarded from the user is embedded in the digital content which have already embedded the copyright information by using the electronic watermark by the user information embedding means 126 based on the conditions for quotation of the digital content (step S111).

Figure 4:
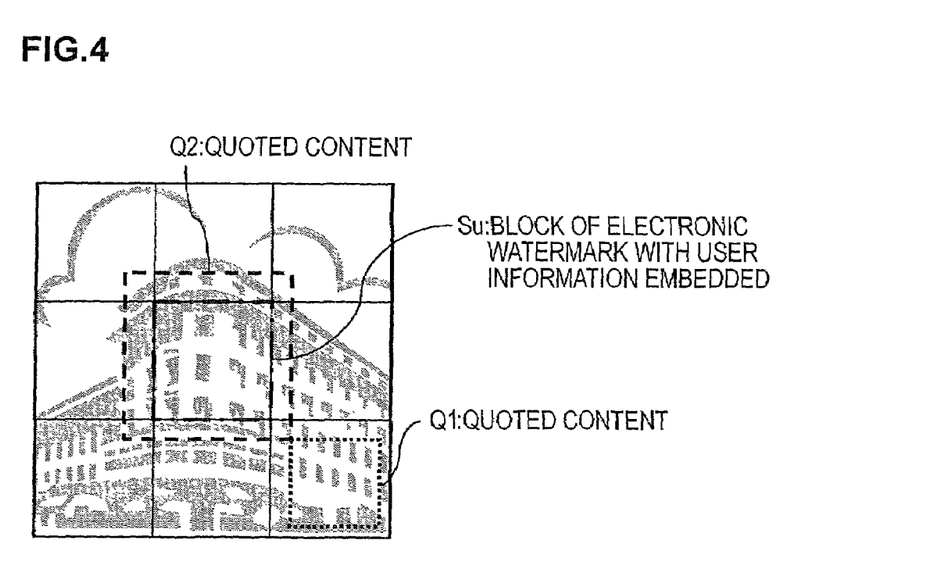
FIG. 4 is a chart illustrating a relation between an user information and a quoted content.

As shown in FIG. 4, the user information can be embedded in each of the plural blocks into which the digital content are divided. In this example, it is necessary to embed the user information so that the user information may be embedded in the quoted content in any illegal quotation of the digital content. Namely, it is necessary that the size Su of each block with the user information embedded have essentially the same or a little larger size compared to that of the content size Sq with the quotation permitted according to the conditions for quotation (Sq<Su).

The example of FIG. 4 indicates that quoted content Q1 meets the conditions for quotation and that quoted content Q2 do not meet the conditions for quotation. In the quoted content Q1, not all parts of the blocks with the user information embedded is included but only a part of the user information is embedded. As a result, the user information cannot be read out by using the electronic watermark. On the other hand, in the quoted content Q2, since all parts of the blocks with the user information embedded is included, the user information can be read out by using the electronic watermark.

When the copyright information and the user information are embedded in the digital content by using the electronic watermark, it is necessary to embed so as not to lose the copyright information and the user information in cutting out the digital content. Also, it is necessary to embed the user information so as not to lose the copyright information embedded in advance. Since the present conventional technique can be adopted to the technique for using the electronic watermark, the detailed explanation is to be omitted.

To sum up the above description, the relation among a content size Sq which is permitted to be quoted according to conditions for quotation, a block size Sc in which the copyright information is embedded and a block size Su in which the user information is embedded is expressed by Sc<Sq<Su.

Further, the above explanation has been provided citing an example that the digital content is formed in still pictures. However, when the digital content are formed in sound and moving pictures, the playback time of the digital content can be adopted as the condition for quotation.

Figure 5:
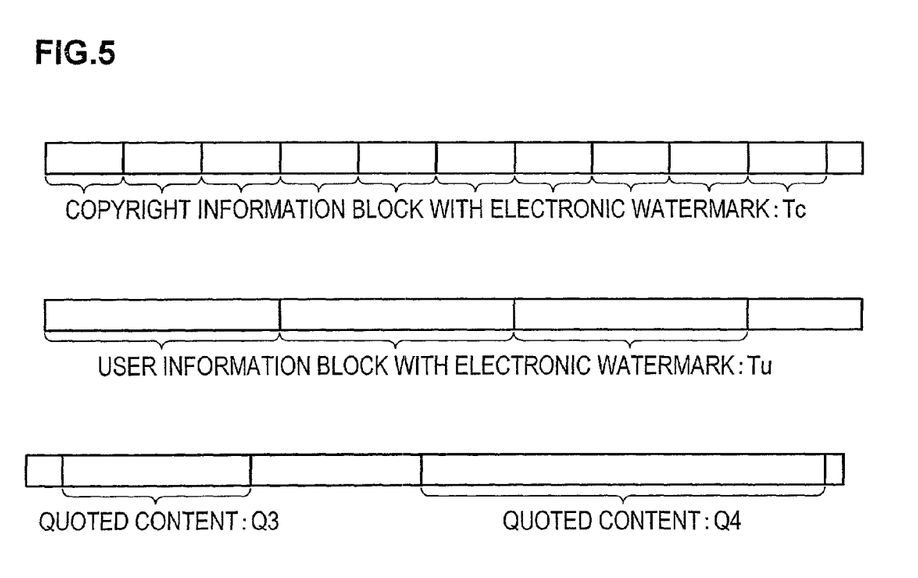
FIG. 5 is a chart illustrating a relation among the copyright information, the user information and the quoted content.

For example, as shown in FIG. 5, the relation among length of the block Tc including the copyright information, length of the block Tu including the user information and length of the quoted content Tq permitted for the quotation is supposed to set as Tc<Tq<Tu. Since there are no blocks with all of the user information included in the quoted content Q3 which meet the conditions for quotation, the user information cannot be read out. On the other hand, in the case of quoted content Q4, which do not meet the conditions for quotation, since there are blocks with all of the user information included, the user information can be read out.

In reference to the flow chart of FIG. 2 again, in the content distribution server 120, the digital content in which the copyright information and the user information are embedded by using the electronic watermark are forwarded to the user terminal 130 (step S112).In step S113, the user terminal 130 receives the content.

In this embodiment, when a user quotes a digital content according to the conditions for quotation, the user information, which is not totally included in the quoted content, cannot be read out. Consequently, the user information is to be prevented from being leaked. On the other hand, when a user quotes against the conditions for quotation, the user information, all of which is included in the quoted content, can be read out. Consequently, the user against the conditions for quotation is to be specified, and the illegal use of the digital content is to be prevented.

Further, since the conditions for quotation are shown to the user in advance, the user can save the trouble of asking for the creator's permission to quote the digital content.

(Second Embodiment)

Figure 6:
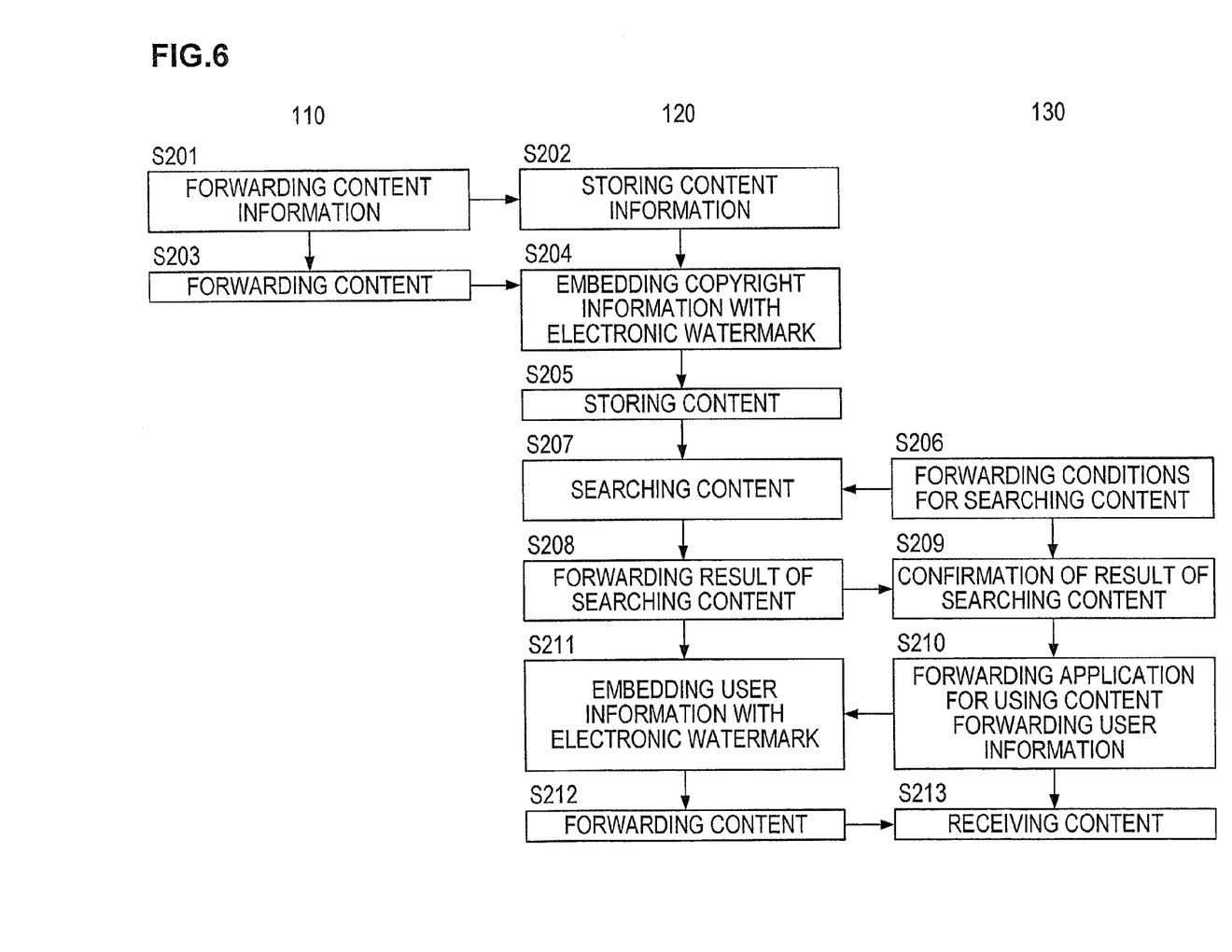
FIG. 6 is a flow chart of other method for distributing digital content with the system of FIG. 1 adopted.

The second embodiment of the present invention is explained in reference to FIG. 6.

The creator of the digital content forwards the copyright information of the digital content and the conditions for quotation of the digital content which the creator is to distribute to the content distribution server 120 by using the creator terminal 110 (step S201). In the content distribution server 120, the copyright information of the digital content and the conditions for quotation of the digital content which have been forwarded from the creator terminal 110 are stored in the content information database 122 to relate with the digital content forwarded afterward (step S202). The creator of the digital content forwards the digital content which the creator is to distribute to the content distribution server 120 by using the creator terminal 110 (step S203). The above steps are identical to that in the first embodiment.

In this embodiment, the content distribution server 120 embeds the copyright information forwarded from the creator terminal 110 in the digital content received from the creator terminal 110 by using the electronic watermark (step S204) and stores the content in the content database 121 (step S205).

The following steps are identical to those in the first embodiment. The user of the digital content accesses the content distribution server 120 and forwards the search conditions of the digital content which the user wants to use to the content distribution server 120 by using the user terminal 130 (step S206). The content distribution server 120 search the digital content which meet the search conditions in accordance with the request for search from the user by using the search means 123 (step S207).

The content distribution server 120 forwards or displays the copyright information of the digital content and the conditions of quotation of the digital content, which meet the result of the search, on step S207 to the user terminal 130 by using content information display means 124 (step S208).

The user of the digital content confirms the copyright information of the digital content and the conditions of quotation of the digital content, which are displayed by the content information display means 124 of the content distribution server 120 (step S209). If the user agrees on the conditions, the user forwards the application for using the digital content and the user information to the content distribution server 120 (step S210).

Since the copyright information has already been embedded in the digital content on step S204, different from that of the first embodiment, the user information forwarded from the user is further embedded in the digital content with the copyright information embedded by using the electronic watermark by the user information embedding means 126 based on the conditions for quotation of the digital content (step S211).

In the content distribution server 120, the digital content embedding the copyright information and the user information by using the electronic watermark are forwarded to the user terminal 130 (step S212). In step S213, the user terminal 130 receives the content.

In this embodiment, the effect which is essentially identical to that of the first embodiment can be achieved. Also, since the content distribution server 120 embeds the copyright information in all of the digital content forwarded from the creator terminal 110 whether the user terminal 130 forwards the application for using the digital content to the content distribution server or not, the original digital content can be protected even when the security for the content distribution server 120 is not protected.

Figure 7:
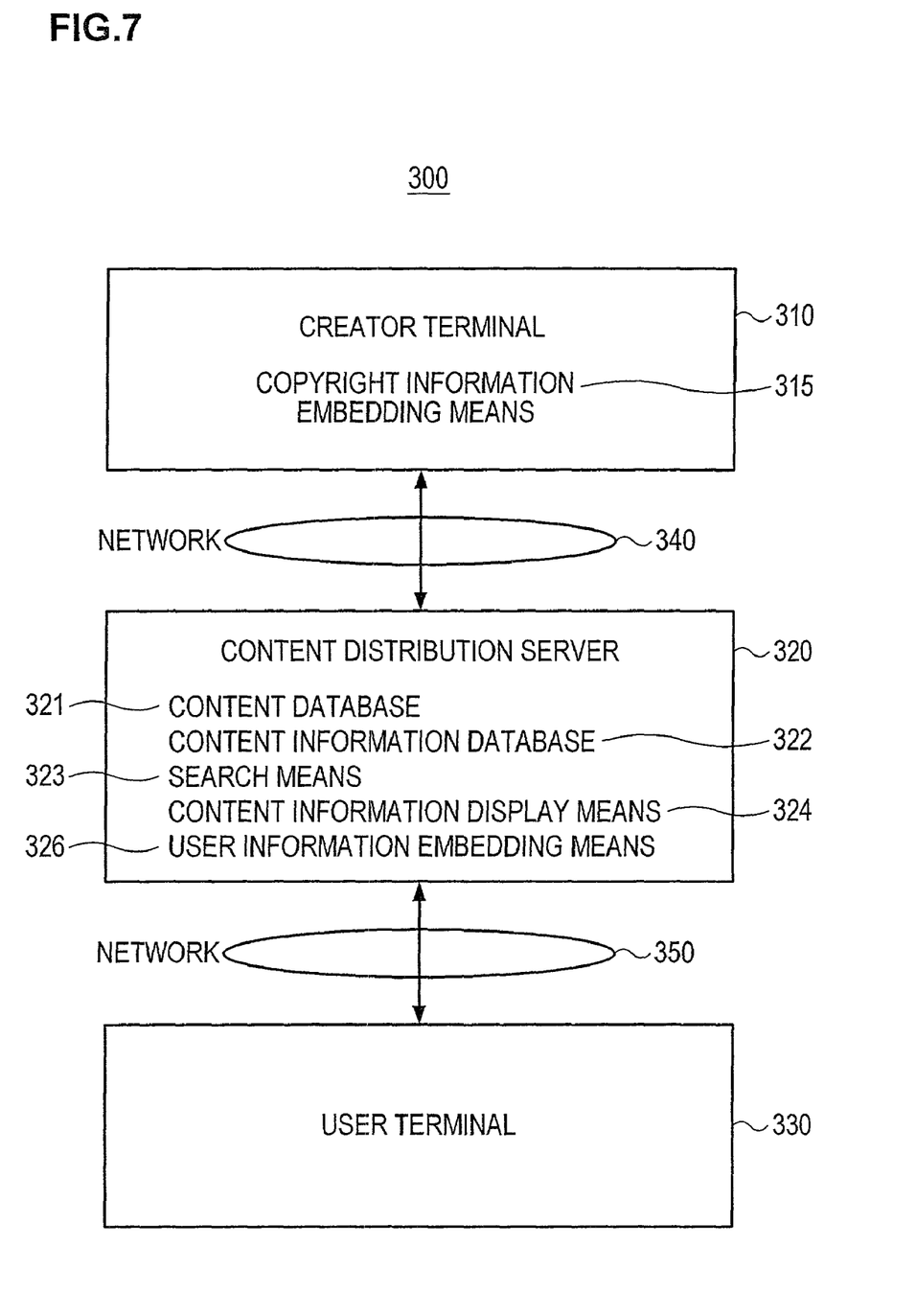
FIG. 7 is a chart illustrating a system for distributing digital content of the third embodiment.
Figure 8:
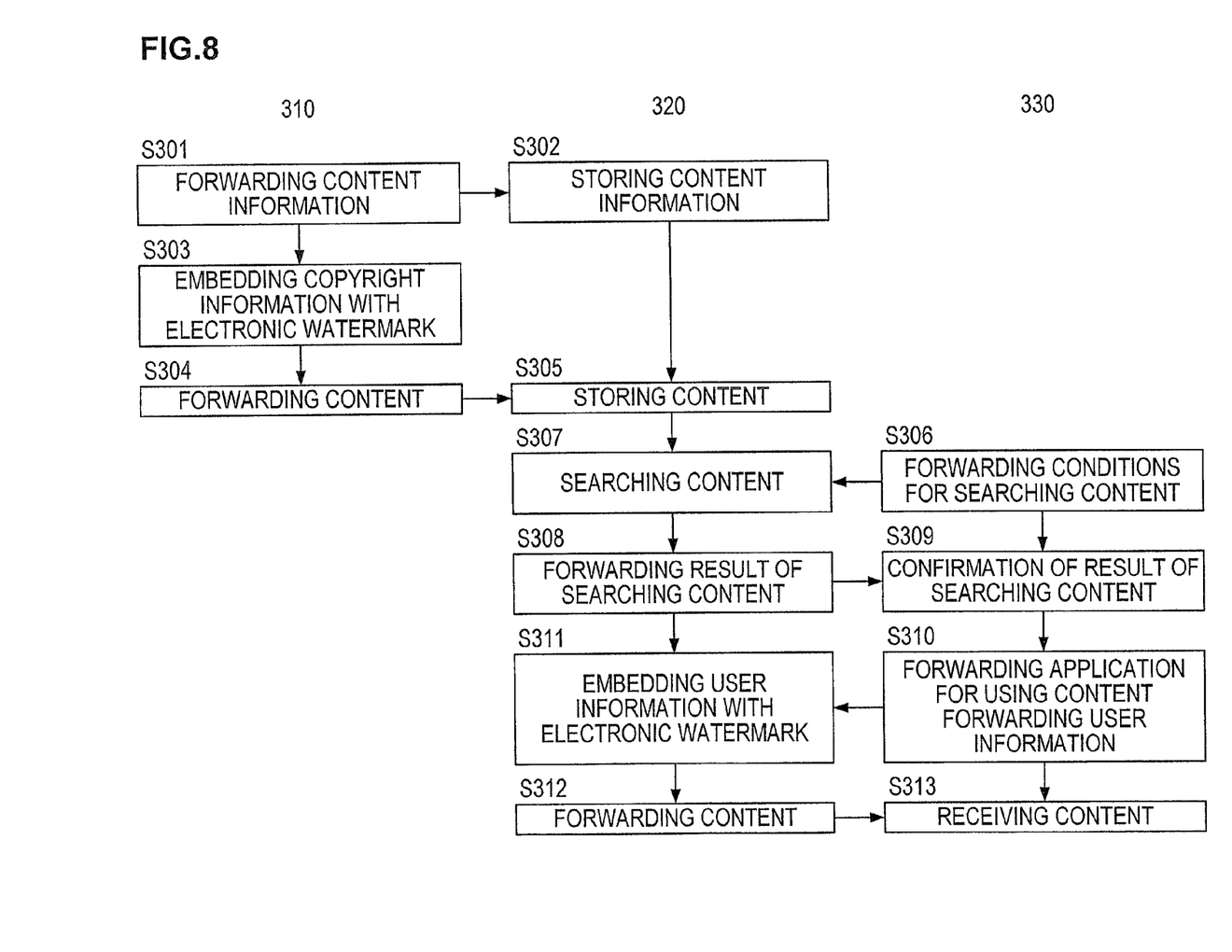
FIG. 8 is a flow chart of a method for distributing digital content with the system of FIG. 7 adopted.

The third embodiment of the present invention is explained in reference to FIGS. 7–8.

As shown in FIG. 7, a digital content distribution system 300 comprises a creator terminal 310 which is used by the creator, an user terminal 330 which is used by the user of the digital content and a content distribution server 320 distributing the digital content to the user terminal 330. The content distribution server 320 and the creator terminal 310 are connected each other through a network 340. The content distribution server 320 and the user terminal 330 are connected each other through a network 350. The network 340 and 350 may be identical each other. In addition, the creator terminal 310 and the user terminal 330 are shown one each in FIG. 7, however, each of them may be shown two or more. Actually, there are numerous creator terminals and user terminals.

This embodiment is characterized in that the creator terminal 310 has watermark embedding means 315 for embedding the copyright information in the digital content to be distributed by using the electronic watermark.

A content database 321, a content information database 322, search means 323, content information display means 324 and user information embedding means 326 which are the components of the content distribution server 320 are essentially identical to the content database 121, a content information database 122, search means 123, content information display means 124 and user information embedding means 126 in the first embodiment.

The explanation with regard to the method for distributing digital content in which the digital content distribution system 300 is to be provided in reference to the flow chart of FIG. 8.

The creator of the digital content forwards the copyright information of the digital content and the conditions for quotation of the digital content which the creator is to distribute to the content distribution server 320 by using the creator terminal 310 (step S301). In the content distribution server 320, the copyright information of the digital content and the conditions for quotation of the digital content which have been forwarded from the creator terminal 310 are stored in the content information database 322 to relate with the digital content forwarded afterward (step S302).

Next, in this embodiment, the creator of the digital content embeds the copyright information in the digital content which the creator is to distribute by using the watermark embedding means 315 in the creator terminal 310 (step S303) and forwards the digital content in which the copyright information is embedded by using the electronic watermark to the content distribution server 320 by using the creator terminal 310 (step S304).

In the content distribution server 320, the digital content in which the copyright information forwarded from the creator terminal 310 is embedded by using the electronic watermark is stored in the content database 321 (step S305).

The following steps are identical to those in the second embodiment. The user of the digital content accesses the content distribution server 320 and forwards the search conditions of the digital content which the user wants to use to the content distribution server 320 by using the user terminal 330 (step S306). The content distribution server 320 searches the digital content which meet the search conditions forwarded by the user in accordance with the request from the user by using the content search means 323 (step S307).

The content distribution server 320 forwards or displays the copyright information of the digital content and the conditions of quotation of the digital content, which meet the result of the search, on step S307 based on the result of the search the user terminal 330 by using content information display means 324 (step S308).

The user of the digital content confirms the copyright information of the digital content and the conditions of quotation of the digital content, which are displayed by the content information display means 324 of the content distribution server 320 (step S309). If the user agrees on the conditions, the user forwards the application for using the digital content and the user information to the content distribution server 320 (step S310).

The user information forwarded from the user is embedded in the digital content in which the copyright information has already been embedded on step S303 by using the electronic watermark by the user information embedding means 326 based on the conditions for quotation of the digital content (step S311).

In the content distribution server 320, the digital content embedding the copyright information and the user information by using the electronic watermark are forwarded to the user terminal 330 (step S312). In step S313, the user terminal 330 receives the content.

In this embodiment, the effect which is essentially identical to that of the system according to the first embodiment can be achieved. In addition, since the creator terminal 310 embeds the means 315 for embedding an electronic watermark with copyright information embedded for embedding the copyright information in the digital content, the original digital content can be protected even when the digital content are leaked while the content distribution server 320 distributes the digital content.

Figure 9:
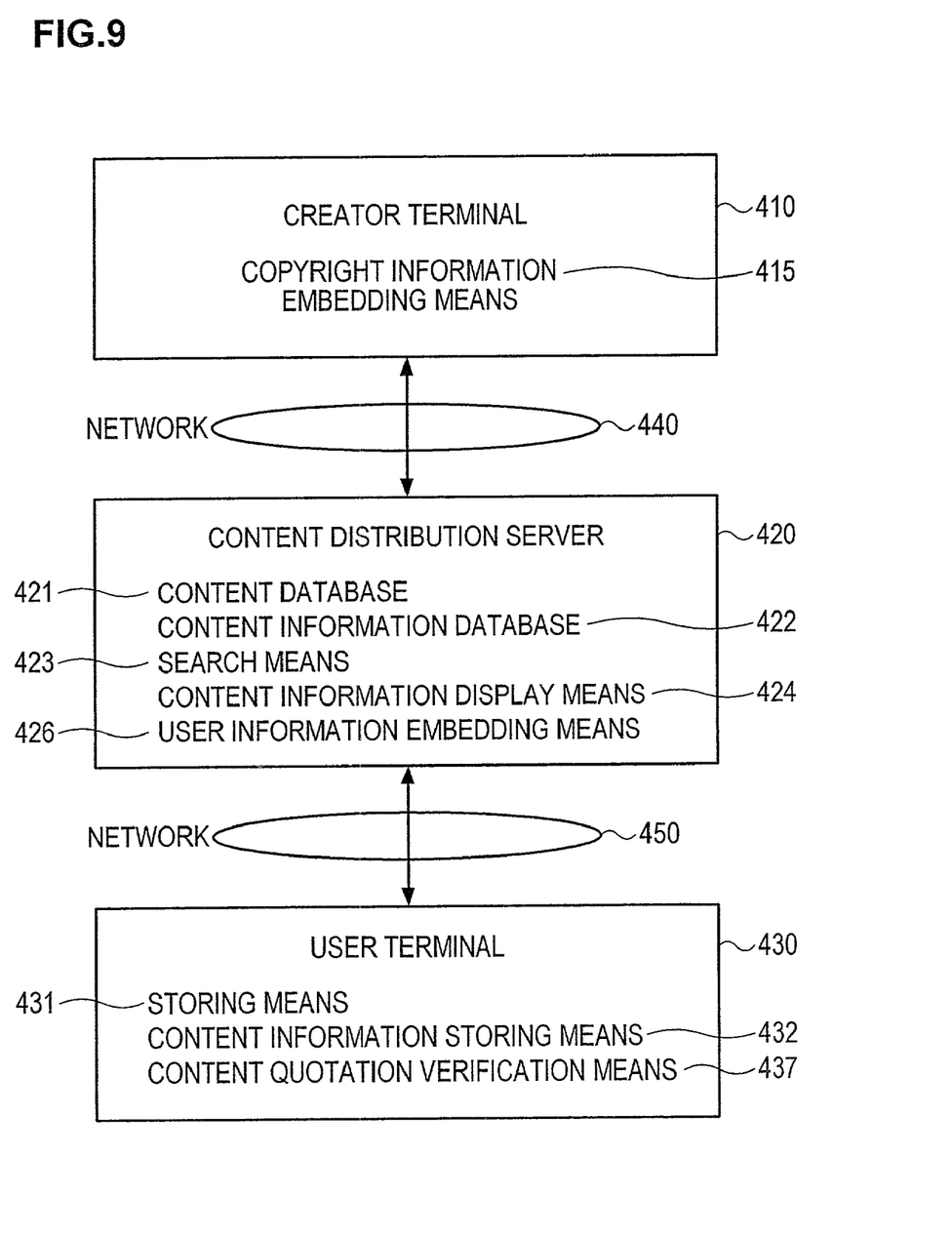
FIG. 9 is a chart illustrating a system for distributing digital content of the fourth embodiment.
Figure 10:
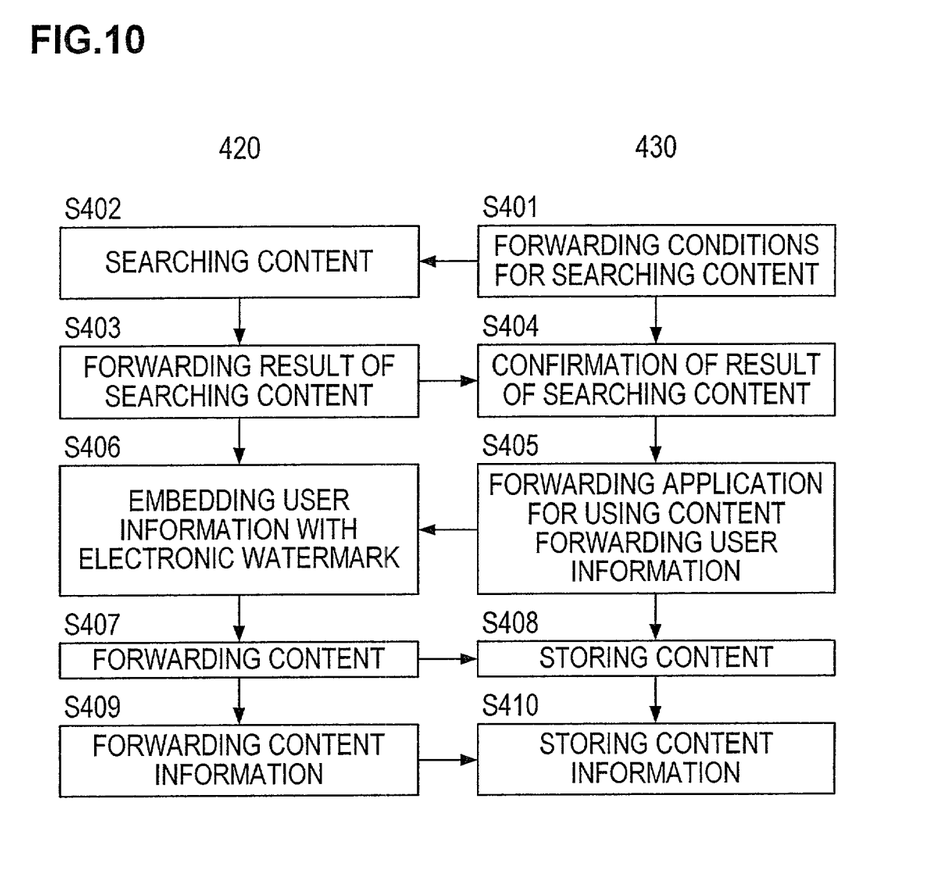
FIG. 10 is a flow chart of a method for distributing digital content with the system of FIG. 9 adopted.
Figure 11:
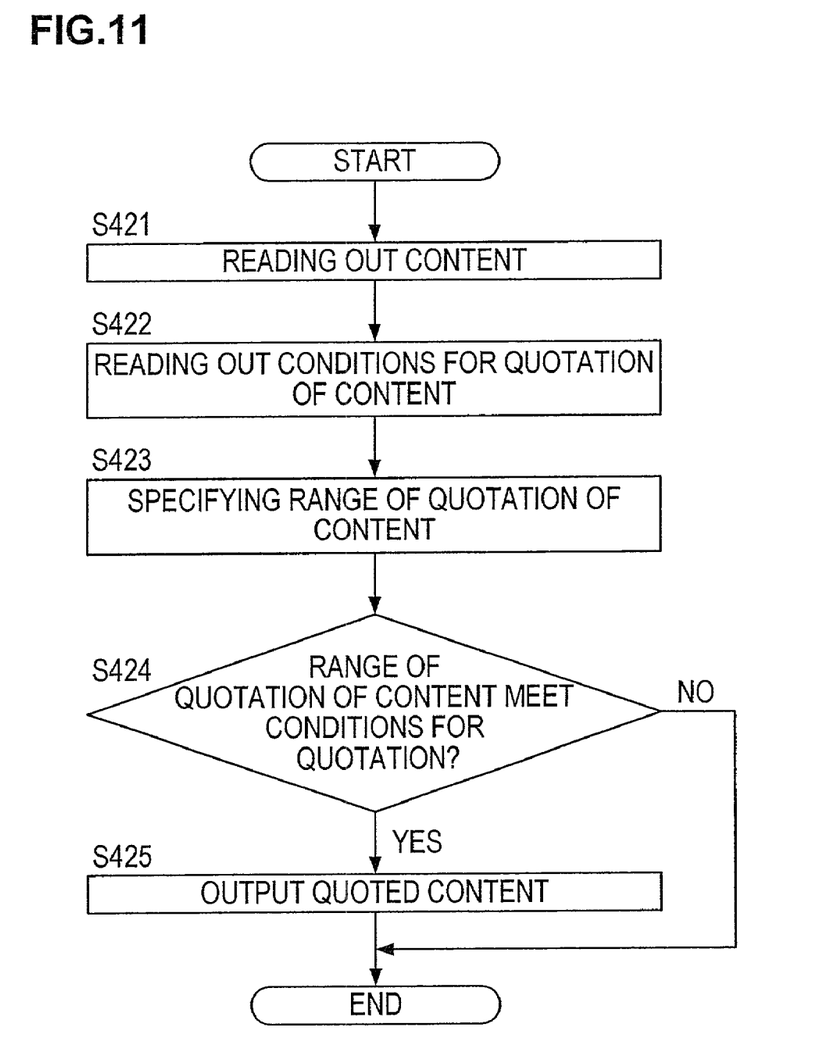
FIG. 11 is a flow chart of the movement of content quotation verification means.

The fourth embodiment of the present invention is explained in reference to FIGS. 9–11.

As shown in FIG. 9, the digital content distribution system 400 comprises a creator terminal 410 which is used by the creators of the works, a content distribution server 420 distributing the digital content and an user terminal 430 which is used by the user of the digital content. The content distribution server 420 and the creator terminal 410 are connected each other through a network 440. The content distribution server 420 and the user terminal 430 are connected each other through a network 450. The network 440 and 450 may be identical each other.

The creator terminal 410 and the content distribution server 420 have the configurations which are identical to those of the creator terminal 310 and the content distribution server 320 in the third embodiment. It is to be noted that the creator terminal 410 and the content distribution server 420 may have the configurations which are identical to those of the creator terminal 110 and the content distribution server 120 in the first and second embodiments.

The explanation is provided with regard to the user terminal 430 hereinafter.

The user terminal 430 includes content storing means 431 for storing the digital content distributed from the content distribution server 420, content information storing means 432 for storing the copyright information and the conditions for quotation of the digital content distributed from the content distribution server 420 to relate with the digital content stored in the content storing means 431 and content quotation verification means 437 for judging whether the quotation of the digital content on the user terminal meets the conditions for quotation or not.

The explanation with regard to the method for distributing digital content in which the digital content distribution system 400 is to be provided in reference to the flow chart of FIG. 10.

The operation of the creator terminal 410 and the content distribution server 420 is essentially identical to that from step S301 to step S305 in the third embodiment. It is to be noted that the operation of the creator terminal 410 and the content distribution server 420 may be identical to that from step S101 to step S104 in the first embodiment or to that from step S201 to step S205 in the second embodiment.

The user of the digital content accesses the content distribution server 420 and forwards the search conditions of the digital content which the user wants to use to the content distribution server 420 by using the user terminal 430 (step S401). The content distribution server 420 searches the digital content which meet the search conditions forwarded by the user in accordance with the request for search from the user by using the content search means 423 (step S402).

The content distribution server 420 forwards or displays the copyright information of the digital content and the conditions of quotation of the digital content, which meet the result of search, on step S402 based on the result of the search the user terminal 430 by using content information display means 424 (step S403).

The user of the digital content confirms the copyright information of the digital content and the conditions of quotation of the digital content, which are displayed by the content information display means 424 of the content distribution server 420 (step S404). If the user agrees on the conditions, the user forwards the application for using the digital content and the user information to the content distribution server 420 (step S405).

The user information forwarded from the user is embedded in the digital content in which the copyright information has already been embedded on step S303 in the third embodiment shown in FIG. 8 by using the electronic watermark by the user information embedding means 426, based on the conditions for quotation of the digital content (step S406).

In the content distribution server 420, the digital content embedding the copyright information and the user information by using the electronic watermark are forwarded to the user terminal 430 (step S407).

In this embodiment, the user terminal 430 stores the digital content forwarded from the content distribution server 420 in the content storing means 431 (step S408). The content distribution server 420 forwards the copyright information and conditions for quotation of the digital content stored in a content information database 422 to the user terminal 430 (step S409). The user terminal 430 stores the copyright information and conditions for quotation of the digital content forwarded from the content distribution server 420 in the content information storing means 432 to relate with the digital content stored in the content storing means 431 (step S410).

The explanation with regard to the movement of the content quotation verification means 437 of the user terminal 430 is to be provided in reference to the flow chart of FIG. 11.

The digital content stored in the content quotation verification means 437 of the user terminal 430 is read out in quoting the digital content (step S421).

The conditions for quotation of the content in accordance with the digital content are read out from the content information storing means 432 of the user terminal 430 (step S422).

The user specifies the range of quotation of the displayed content (step S423).

The content quotation verification means 437 judges whether the range of quotation specified by the user meets the conditions for quotation of the content or not (step S424).

If the range of quotation specified by the user meets the conditions for quotation of the content, the content quotation verification means 437 outputs the content for quotation (step S425).

If the range of quotation specified by the user does not meet the conditions for quotation of the content, the content quotation verification means 437 can be set to alarm the user, to terminate the means and to get back to the step to specify the range of quotation (step S423).

In this embodiment, by setting the content quotation verification means 437 for judging whether the quotation of the digital content on the user terminal 430 meets the conditions for quotation or not, when the user of the digital content quotes against the conditions for quotation on the user terminal, the user is to be alarmed. Consequently, the careless illegal quotation of the content and the leak of the user information are to be prevented.

Although the system and method for distributing digital content have been described as the preferred embodiments, the present invention is not restricted to such examples. It is obvious to those skilled in the art that the present invention may be modified or changed within a scope of the invention.

In the embodiments described above, the explanation has been provided citing an example that digital content are forwarded and distributed among a creator terminal, a content distribution server and an user terminal. However, for example, the creator of the digital content may go to the content distribution server to register the digital content recorded by the creator in such storage medium as CD-ROM. The user also may go to the content distribution server to purchase the storage medium with the digital content recorded.

In the embodiments described above, the explanation has been provided citing an example that the copyright information and the user information are embedded in the digital content by using an electronic watermark. However, any suitable conventional technique to embed information in digital content or any technique to be developed in a future can be adopted to the present invention.

In addition, data encryption technique may be adopted to exchange of digital content through network. For example, the digital content which have been encrypted in advance and the decryption key of the encrypted digital content may be sent separately.

Further, in the embodiments described above, the explanation has been provided citing an example of the user information embedded in the content by the predetermined area of picture, however, the user information is embedded properly according to the type of the content, for example, by the predetermined time of music in the case that the type of the content is music. It is to be noted that the user information may be embedded in a specific object (a characteristic object) in the content other than embedded by the predetermined area and time.

In the present invention as described above, when a user of the digital content quotes according to the conditions for quotation, the user information, which is not totally embedded in the quoted content, cannot be read out. Consequently, the user information is to be prevented from being leaked. On the other hand, when a user of the digital content quotes against the conditions for quotation, the user information, all of which is embedded in the quoted content, can be read out. Consequently, the user against the conditions for quotation is to be specified, and the illegal use of the digital content is to be prevented.

What is claimed is:

1. A system for distributing digital content comprising:
   at least one creator terminal creating digital content;
   at least one user terminal utilizing the digital content; and
   a content distribution server which distributes the digital content to the at least one user terminal wherein;
   the content distribution server comprising: a content database for storing the digital content forwarded from the creator terminal;
   a content information database for storing copyright information and conditions for quotation of the digital content;
   copyright information embedding means for embedding the copyright information in the digital content; and
   user information embedding means for embedding user information in the digital content,
   and wherein;
   the relation among a content size Sq which is permitted to be quoted according to the conditions for quotations, a content size Sc in which the copyright information is embedded and a content size Su in which the user information is embedded is expressed by Sc<Sq<Su.

2. A system for distributing digital content according to claim 1, wherein the at least one user terminal comprising:
   content storing means for storing the digital content distributed from the content distribution server;
   content information storing means for storing the copyright information and the conditions for quotation of the digital content distributed from the content distribution server; and
   content quotation verification means for judging whether the quotation of the digital content on the at least one user terminal meets the conditions for quotation or not.

3. A system for distributing digital content according to claim 1, wherein the content distribution server comprising:
   content search means for searching the digital content stored in the content information database; and
   content information display means for displaying the copyright information and the conditions for quotation of the digital content based on the content search means.

4. A system for distributing digital content according to claim 1, wherein;
   the copyright information embedding means embedding the copyright information in the digital content by using the electronic watermark.

5. A system for distributing digital content according to claim 1, wherein;
   the user information embedding means embedding the user information in the digital content by using the electronic watermark.

6. A system for distributing digital content comprising:
   at least one creator terminal creating digital content;
   at least one user terminal utilizing the digital content; and
   a content distribution server which distributes the digital content to the at least one user terminal wherein;
   the at least one creator terminal comprising: copyright information embedding means for embedding copyright information in the digital content;

the content distribution server comprising: a content database for storing the digital content forwarded from the at least one creator terminal;
a content information database for storing the copyright information and conditions for quotation of the digital content forwarded from the at least one creator terminal; and
user information embedding means for embedding user information in the digital content,
and wherein;
the relation among a content size Sq which is permitted to be quoted according to the conditions for quotations, a content size Sc in which the copyright information is embedded and a content size Su in which the user information is embedded is expressed by Sc<Sq<Su.

7. A system for distributing digital content according to claim 6, wherein the at least one user terminal comprising:
content storing means for storing the digital content distributed from the content distribution server;
content information storing means for storing the copyright information and the conditions for quotation of the digital content distributed from the content distribution server; and
content quotation verification means for judging whether the quotation of the digital content on the at least one user terminal meets the conditions for quotation or not.

8. A system for distributing digital content according to claim 6, wherein the content distribution server comprising:
content search means for searching the digital content stored in the content information database; and
content information display means for displaying the copyright information and the conditions for quotation of the digital content based on the content search means.

9. A system for distributing digital content according to claim 6, wherein;
the copyright information embedding means embedding the copyright information in the digital content by using the electronic watermark.

10. A system for distributing digital content according to claim 6, wherein;
the user information embedding means embedding the user information in the digital content by using the electronic watermark.

11. A method for distributing digital content wherein a distribution system comprises:
at least one creator terminal creating the digital content;
at least one user terminal utilizing the digital content; and
a content distribution server which distributes the digital content to the at least one user terminal,
and wherein comprising: a step in which the at least one creator terminal forwards the digital content, copyright information of the digital content, and conditions for quotation of the digital content to the content distribution server;
a step in which the at least one user terminal forwards the application for using the digital content to the content distribution server; and
a step in which the content distribution server embeds the copyright information in the digital content which the at least one user terminal has applied for using and embeds user information in the digital content,
and wherein;
the relation among a content size Sq which is permitted to be quoted according to the conditions for quotation, a content size Sc in which the copyright information is embedded and a content size Su in which the user information is embedded is expressed by Sc<Sq<Su.

12. A method for distributing digital content according to claim 11, wherein;
the method embeds a step for judging whether the quotation of the digital content on the user terminal meets the conditions for quotation or not.

13. A method for distributing digital content according to claim 11, wherein;
a step in which the at least one user terminal forwards the search conditions of the digital content to the content distribution server;
a step in which the content distribution server searches the digital content in accordance with the search conditions of the content; and
a step in which the content distribution server forwards the result of search the at least one user terminal.

14. A method for distributing digital content according to claim 11, wherein;
the copyright information is embedded in the digital content by the copyright information embedding means by using the electronic watermark.

15. A method for distributing digital content according to claim 11, wherein;
the user information is embedded in the digital content by the user information embedding means by using the electronic watermark.

16. A method for distributing digital content wherein a distribution system comprises: at least one creator terminal creating the digital content;
at least one user terminal utilizing the digital content; and
a content distribution server which distributes the digital content to the at least one user terminal,
and wherein comprising: a step in which the at least one creator terminal forwards the digital content, copyright information of the digital content, and quotation conditions of the digital content to the content distribution server;
a step in which the content distribution server embeds the copyright information in the digital content forwarded from the at least one creator terminal;
a step in which the at least one user terminal forwards the application for using the digital content to the content distribution server; and
a step in which the content distribution server embeds user information in the digital content,
and wherein;
the relation among a content size Sq which is permitted to be quoted according to the conditions for quotation, a content size Sc in which the copyright information is embedded and a content size Su in which the user information is embedded is expressed by Sc<Sq<Su.

17. A method for distributing digital content according to claim 16, wherein;
the method includes a step for judging whether the quotation of the digital content on the user terminal meets the conditions for quotation or not.

18. A method for distributing digital content according to claim 16, wherein;
a step in which the at least one user terminal forwards the search conditions of the digital content to the content distribution server;
a step in which the content distribution server searches the digital content in accordance with the search conditions of the content; and
a step in which the content distribution server forwards the result of search the at least one user terminal.

19. A method for distributing digital content according to claim 16, wherein;
the copyright information is embedded in the digital content by the copyright information embedding means by using the electronic watermark.

20. A method for distributing digital content according to claim 16, wherein;
the user information is embedded in the digital content by the user information embedding means by using the electronic watermark.

21. A method for distributing digital content wherein the system comprises: at least one creator terminal creating the digital content;
at least one user terminal utilizing the digital content; and
a content distribution server which distributes the digital content to the at least one user terminal,
and wherein comprising: a step in which the at least one creator terminal forwards copyright information of the digital content, and quotation conditions of the digital content to the content distribution server;
a step in which the at least one creator terminal embed the copyright information in the digital content;
a step in which the at least one creator terminal forwards the digital content with the copyright information embedded to the content distribution server; and a step in which the content distribution server embeds user information in the digital content,
and wherein;
the relation among a content size Sq which is permitted to be quoted according to the conditions for quotation, a content size Sc in which the copyright information is embedded and a content size Su in which the user information is embedded is expressed by Sc<Sq<Su.

22. A method for distributing digital content according to claim 21, wherein;
the method includes a step for judging whether the quotation of the digital content on the at least one user terminal meets the conditions for quotation or not.

23. A method for distributing digital content according to claim 21, wherein;
a step in which the at least one user terminal forwards the search conditions of the digital content to the content distribution server;
a step in which the content distribution server searches the digital content in accordance with the search conditions of the content; and
a step in which the content distribution server forwards the result of search the at least one user terminal.

24. A method for distributing digital content according to claim 21, wherein;
the copyright information is embedded in the digital content by the copyright information embedding means by using the electronic watermark.

25. A method for distributing digital content according to claim 21, wherein;
the user information is embedded in the digital content by the user information embedding means by using the electronic watermark.

* * * * *